(12) United States Patent
Yamasaki (10) Patent No.: US 7,217,388 B2
(45) Date of Patent: May 15, 2007

(54) METHOD FOR PREPARING REINFORCED PLATINUM MATERIAL

(75) Inventor: Haruki Yamasaki, Kanagawa (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 351 days.

(21) Appl. No.: 10/276,322

(22) PCT Filed: Apr. 12, 2002

(86) PCT No.: PCT/JP02/03663

§ 371 (c)(1),
(2), (4) Date: Nov. 25, 2002

(87) PCT Pub. No.: WO02/083961

PCT Pub. Date: Oct. 24, 2002

(65) Prior Publication Data

US 2003/0124015 A1    Jul. 3, 2003

(30) Foreign Application Priority Data

Apr. 13, 2001    (JP) .............................. 2002-115161

(51) Int. Cl.
*B22F 3/10*    (2006.01)
(52) U.S. Cl. .......................................... 419/28; 419/32
(58) Field of Classification Search .................. 419/33, 419/20
See application file for complete search history.

(56) References Cited

U.S. PATENT DOCUMENTS

| | | | | |
|---|---|---|---|---|
| 2,636,819 | A | * | 4/1953 | Streicher .................... 420/461 |
| 3,166,417 | A | * | 1/1965 | Gainsbury ................... 419/21 |
| 3,511,640 | A | | 5/1970 | Kelemen |
| 3,578,443 | A | * | 5/1971 | Grant et al. .................. 419/19 |
| 3,606,502 | A | * | 9/1971 | Gerhard et al. ............. 384/501 |

(Continued)

FOREIGN PATENT DOCUMENTS

JP    4-236701    8/1992

(Continued)

OTHER PUBLICATIONS

ASM Handbook, vol. 7, Powder Metallurgy, pp. 56-64, 149, 1984.*

(Continued)

*Primary Examiner*—Roy King
*Assistant Examiner*—Kathleen McNelis
(74) *Attorney, Agent, or Firm*—Rothwell, Figg, Ernst & Manbeck, P.C.

(57) ABSTRACT

The present invention provides a method in which a strengthened platinum material can be produced, in which no blisters occur on the surface of the material even after heat treatment of 1,400° C. or higher and a metal oxide such as zirconium oxide is finely dispersed, and which has excellent high-temperature creep properties, when the strengthened platinum material is produced using a melt-sprayed platinum alloy powder. The method for producing a strengthened platinum material includes oxidizing a platinum alloy powder obtained by melt-spray, wet-milling the platinum alloy powder by adding an organic solvent, sintering, and forging, wherein the wet-milled platinum alloy fine powder is charged into a heat resistant container and heated to 1,200 to 1,400° C. in a vacuum atmosphere to be subjected to degassing.

5 Claims, 2 Drawing Sheets

U.S. PATENT DOCUMENTS

| | | | |
|---|---|---|---|
| 3,622,310 A * | 11/1971 | Reinacher et al. | 420/467 |
| 3,696,502 A | 10/1972 | Darling | |
| 3,709,667 A * | 1/1973 | Selman et al. | 75/234 |
| 4,292,079 A * | 9/1981 | Pickens et al. | 75/232 |
| 4,409,038 A * | 10/1983 | Weber | 148/12.7 A |
| 4,600,556 A * | 7/1986 | Donachie et al. | 420/542 |
| 4,705,560 A * | 11/1987 | Kemp, Jr. et al. | 75/0.5 |
| 4,707,184 A * | 11/1987 | Hashiguchi et al. | 75/228 |
| 5,623,725 A | 4/1997 | Disam | |
| 6,511,523 B2 * | 1/2003 | Shoji et al. | 75/235 |
| 6,841,121 B2 * | 1/2005 | Shoji et al. | 419/19 |

FOREIGN PATENT DOCUMENTS

| | | |
|---|---|---|
| JP | 6-336631 | 12/1994 |
| JP | 8-134511 | 5/1996 |
| JP | PAJ08-134511 * | 5/1996 |
| JP | 2000160268 A | 6/2000 |

OTHER PUBLICATIONS

Machine translation of JP 06-336631 into English, patent publication date Jun. 12, 1994, machine translation date Oct. 13, 2006.*

J. E. Hughes, et al., "Dispersion Strengthening of Platinum," *Planseeberichte Für Pulvemetallurgie*, 22(4):292-296 (1974).

* cited by examiner

METHOD FOR PREPARING REINFORCED PLATINUM MATERIAL

TECHNICAL FIELD

The present invention relates to a method for producing a strengthened platinum material, which is a structural material for use in handling a glass or ceramic material, such as an optical glass and an optical fiber, in a molten state, and in particular, relates to a technology for producing a strengthened platinum material using a platinum alloy powder obtained by melt-spray.

BACKGROUND ART

A strengthened platinum material having good high-temperature strength properties has conventionally been used as a structural material for handling a glass or ceramic material in a molten state. The strengthened platinum material for use in melting the glass material or the like at high temperature is required to have high so-called creep strength. In producing such a strengthened platinum material, the preparation of a material particularly having a prolonged durability time until a creep rupture is an important challenge.

This strengthened platinum material is required to have, for example, high creep strength at 1,400° C. as high temperature strength properties. Control of material structure is therefore very important in the production of the strengthened platinum material. A method for finely and uniformly dispersing a metal oxide such as zirconium oxide in a platinum base metal of the strengthened platinum material has conventionally been known for improving the high creep strength, and various production methods have been proposed to obtain the strengthened platinum material in which such a metal oxide is dispersed.

As one of the examples, Japanese Patent Application Laid-Open No. 8-134511 relates to a method for producing a strengthened platinum material in which a metal oxide is finely dispersed in a platinum base, and discloses that after a platinum alloy consisting of a metal element as a precursor for the metal oxide and platinum is melt-sprayed, the resultant platinum alloy powder is subjected to wet-milling.

According to the production method, a strengthened platinum material can be obtained, in which the production time is shortened; blisters do not occur in production steps such as compression molding, heat treatment, hot forging, annealing, and cold rolling; and which has stable creep strength. The strengthened platinum material according to the production method, however, sometimes produced fine blisters on the surface of the material upon heat treatment at a high temperature of 1,400° C.

The occurrence of fine blisters on the surface of the material at high-temperature heat treatment of the strengthened platinum material obtained by the production method according to the Japanese Patent Application Laid-Open No. 8-134511 is estimated due to the release at the high-temperature heat treatment of the gas adsorbed to the surface of fine powders when the melt-sprayed platinum alloy powder is subjected to wet-milling. In order to prevent fine blisters at the high-temperature heat treatment, it is contemplated to carry out subsequent production treatment steps at high temperatures, thereby minimizing the gas adsorbed to the platinum alloy fine powder.

Meanwhile, Japanese Patent Application Laid-Open No. 2000-160268 discloses a method, in which a platinum alloy including 0.05 to 2% by weight of zirconium, samarium or the like is milled by an atomizing process, oxidized and sintered for 1 to 100 hours at a high temperature of 1,400 to 1,750° C., and then subjected to plastic working. The Japanese Patent Application further describes that when the platinum alloy powder is oxidized and sintered at a high temperature of 1,400° C. or higher, metal oxide particles such as zirconium oxide dispersed in the strengthened platinum alloy material are dispersed in a state having a relatively large diameter of about 1 to 10 μm.

According to the production method, although an easily deformed strengthened platinum material may be achieved, the material can only maintain its creep properties at a high temperature of 1,000° C. or higher at a certain level, and creep properties at even higher temperatures tend to drop compared with the case of fine metal oxide particles. That is to say, when the temperature for subsequent production treatment processes are simply raised to high temperatures, in order to remove the gas adsorbed to a wet-milled platinum alloy fine powder in the production method according to the Japanese Patent Application Laid-Open No. 8-134511, it is estimated that the particle size of the metal oxide will be increased, which causes reduction of the high-temperature creep properties.

DISCLOSURE OF THE INVENTION

The present invention is provided under the above situation as a background, and provides a method in which a strengthened platinum material can be produced, in which no blisters occur on the surface of the material even after heat treatment of 1,400° C. or higher and a metal oxide such as zirconium oxide is finely dispersed, and which has excellent high-temperature creep properties, when the strengthened platinum material is produced using a melt-sprayed platinum-alloy powder.

In order to solve the above problems, the inventor has performed various studies on heat treatment conditions for each of the treatment processes in producing a strengthened platinum material using a melt-sprayed platinum alloy powder, and has discovered that when the platinum alloy fine powder obtained from wet-milling is subjected to degassing at 1,200 to 1,400° C. in a vacuum atmosphere, blisters stop occurring on the surface of the strengthened platinum material in a high temperature atmosphere of 1,400° C. or higher and a material dispersing metal oxide particles which have not increased in size can be obtained, thereby coming up with the present invention.

The present invention is a method for producing a strengthened platinum material comprising oxidizing a platinum alloy powder obtained by melt-spray, wet-milling the platinum alloy powder by using an organic solvent, sintering, and forging, wherein the wet-milled platinum alloy fine powder is charged into a heat resistant container and heated to 1,200 to 1,400° C. in a vacuum atmosphere to be subjected to degassing.

By the degassing according to the present invention, an organic solvent and other adsorbed gases adsorbed to the platinum alloy fine powder at the wet-milling are almost completely desorbed from the fine powder surface, thereby eliminating the occurrence of blisters produced on the surface of the material at high-temperature heat treatment. In addition, even subjected to such a high temperature degassing, the strengthened platinum material produced through subsequent sintering and forging treatments maintains a state in which metal oxide particles such as zirconium oxide are finely dispersed, and has excellent high-temperature creep properties.

At the degassing according to the present invention, the wet-milled platinum alloy fine powder is charged into a heat resistant container. At this time, the platinum alloy fine powder charged into the heat resistant container is preferably not compacted by tapping or compression. Because the fine powder particles come into intimate contact with each other when the platinum alloy fine powder in the heat resistant container is compacted, which prevents the adsorbed gas from being sufficiently desorbed from the surface of the fine powder. When the degassing according to the present invention is carried out at a temperature below 1,200° C., adsorbed organic solvent and other adsorbed gases tend to be desorbed only insufficiently from the surface of the fine powder, and when it is carried out at a temperature above 1,400° C., sintering develops to facilitate trapping of the adsorbed organic solvent and other adsorbed gases inside. The pressure at the degassing according to the present invention is preferably reduced to a vacuum atmosphere of 1 Pa or below, and the pressure above 1 Pa tends to be insufficient for removing the adsorbed gas or the like. The vacuum atmosphere may be in a reduced pressure of 1 kPa to 10 kPa while introducing inert gas such as argon gas, if it is possible to remove the organic solvent and other adsorbed gases adsorbed to the platinum alloy fine powder.

Further, in the method for producing a strengthened platinum material according to the present invention, the degassed platinum alloy fine powder is preferably heated at 1,400 to 1,700° C. in an inert gas atmosphere for sintering. The platinum alloy fine powder in the heat resistant container is sintered to some extent, since the degassing according to the present invention is carried out at a high temperature of 1,200 to 1,400° C. Therefore, the platinum alloy fine powder taken out of the heat resistant container after the degassing forms a sintered body having a shape following the shape of the heat resistant container. It may be sintered in an air atmosphere, but when carried out in an air atmosphere, a metal oxide in the sintered body tends to aggregate to increase in size by an influence of oxygen in the atmosphere. Thus, the platinum alloy fine powder after degassing is sintered by heating at 1,400 to 1,700° C. in an inert gas atmosphere such as argon gas, thereby stably achieving a state where the metal oxide in the strengthened platinum material is finely dispersed. When the sintering is carried out at a temperature below 1,400° C., the platinum alloy fine powder will not be sintered sufficiently, which tends to drop strength properties. When carried out above a temperature of 1,700° C., the platinum particle in the strengthened platinum material as well as the metal oxide increase in size, which tends to prevent high-temperature creep properties from meeting a target.

As described above, when a platinum particle and a metal oxide increase in size, a strengthened platinum material tends to have lower high-temperature creep properties, so that it is important to produce a material such that the material can maintain a state where fine particles are dispersed. During a study by the inventor of the increase of the particle size in the strengthened platinum material, it has been discovered that a strengthened platinum material having fine particles and good high-temperature creep properties can be stably produced by continuously degassing and sintering a platinum alloy fine powder after wet-milling.

In treatment procedures for a production method according to the present invention, a wet-milled platinum alloy fine powder is charged into a heat resistant container, which is disposed in a degassing furnace, heated to a predetermined degassing temperature, degassed, cooled, and taken out of the degassing furnace temporarily. It is then charged into a separate sintering furnace and heated again to a predetermined sintering temperature for sintering. These are ordinary procedures. Meanwhile, when the wet-milled platinum alloy fine powder is continuously degassed and sintered, that is, when it is degassed and sintered without changing the treatment furnaces between the degassing and the sintering, the increase of the particle size is retarded. More specifically, the heat resistant container, into which a platinum alloy fine powder has been charged, is disposed within a vacuum inert gas sintering furnace (for example, a vacuum argon sintering furnace) to perform degassing in a reduced pressure atmosphere, and left within the same furnace without taking out of the furnace to perform predetermined sintering. This procedure facilitates stably achieving a dispersed state of fine particles compared with the case where degassing and sintering are performed separately. This results in elimination of the occurrence of blisters on the material surface and enables stable production of a strengthened platinum material having excellent high-temperature creep properties.

When the degassing and sintering are carried out continuously, as described above, preferably, the degassing is carried out at a temperature of 1,200 to 1,400° C., and the sintering is carried out at a temperature of 1,400 to 1,700° C., so that when both the treatments are continuously carried out, the temperature range will desirably be from 1,200 to 1,700° C. In addition, when the degassing and sintering are carried out continuously, the oxidizing temperature before wet-milling is desirably as low as possible. A platinum alloy powder is typically oxidized at a temperature ranging from 1,000 to 1,300° C., and for retarding the increase of particle size, it is preferably oxidized at a temperature ranging from 900 to 1,100° C. Because oxidation of the platinum alloy powder in this temperature range tends to provide stabler production of the strengthened platinum alloy including fine particles.

In addition, the wet-milling in a method for producing a strengthened platinum material according to the present invention preferably involves the use of heptane or alcohol as an organic solvent. Heptane or alcohol enhances a milling effect of a melt-sprayed platinum alloy powder, and is easily desorbed from the surface of a platinum alloy fine powder by the degassing according to the present invention.

A platinum alloy for use in producing a strengthened platinum material according to the present invention preferably includes platinum and at least one selected from the Group IVa elements, the lanthanum series rare-earth elements, rhodium, iridium, and gold. These elements are dispersed in the strengthened platinum material as metal oxides capable of improving high-temperature creep properties. Particularly, the platinum alloy including zirconium, samarium, europium, or rhodium may be the strengthened platinum material having a good high-temperature creep properties.

BEST MODE FOR CARRYING OUT THE INVENTION

Preferred embodiments of the present invention will now be described.

EXAMPLE 1

A platinum-zirconium alloy ingot of 14 kg containing 0.3% by weight of zirconium was first prepared by vacuum melt casting. The platinum alloy ingot was subjected to groove rolling to form a drawn wire having a wire diameter of 1.6 mm. The drawn wire was then melted with arc discharge using an electric arc spray gun, and the liquid platinum-zirconium alloy was sprayed by compressed air toward a distilled water surface 1 m apart from a muzzle of the electric arc spray gun to prepare 12 kg of a spherical powder having a particle diameter of 10 to 200 μm. The spherical powder was charged into an open-top alumina tray and oxidized for 24 hours at 1,250° C. in an air atmosphere. The oxidized spherical powder of 12 kg was divided into three equal parts (4 kg).

Subsequently, 4 kg of the oxidized spherical powder and 7 kg of zirconia balls having a diameter of 5 mm were charged into an Attritor pot, which is a wet-mill. This Attritor pot includes a zirconia container, and a lid and a milling blade provided in the container are made from SUS 304. The container also provides a pressure-reducing mechanism and a valve for charging an organic solvent.

After the Attritor pot was charged, it was decompressed to 0.4 Pa by the pressure-reducing mechanism. Heptane of 30 cc was added from the valve for charging an organic solvent while introducing argon gas into the pot, and the valve was closed when the pressure inside the pot finally reached 1.1 atm of argon pressure. The Attritor pot was attached to an upright drill press, and the milling blade was rotated at a rotational speed of 200 rpm to perform wet-milling for about 15 hours. The wet-milled fine powder was poured into a lidless stainless steel pad container and dried for two hours at 120° C. to remove heptane. The remaining oxidized spherical powder (8 kg) was wet-milled and dried in a similar manner. Thus obtained fine powder was flake-like in various shapes having a thickness of about 0.3 to about 1 μm, each surface area being very large. The fine powder of 4 kg was used for the Example and remaining 8 kg was used for Comparative Examples.

In this Example, then, 4 kg of the wet-milled fine powder was filled into a lidless carbon container (80 mm long×80 mm wide×100 mm deep), put into a vacuum calcinating furnace, heated from room temperature to 1,300° C. at a rate of temperature increase of 5° C./min in a vacuum of 0.4 Pa, subjected to degassing for three hours while maintaining a temperature of 1,300° C., and cooled. When the platinum alloy fine powder was taken out from the carbon container after the degassing and cooling, the fine powder was found to have formed a sintered body having an inner shape of the carbon container, and the fine powder sintered body had a denseness of 30%. For determining the denseness, the mass of the sintered body and its dimension were measured, and the density of the sintered body was calculated from the mass and volume. The density of the sintered body is divided by the density of platinum ($21.37 \times 10^3$ kg/m³) and the result is shown as a percentage to obtain the denseness.

The degassed fine powder sintered body was, as it was, put into a vacuum argon sintering furnace, heated from room temperature to 1,300° C. at a rate of temperature increase of 5° C./min in an argon atmosphere of 0.4 Pa, further heated from 1,300° C. to 1,600° C. at a rate of temperature increase of 10° C./min, and sintered for three hours while maintaining a temperature of 1,600° C. The denseness of the fine powder sintered body after the sintering was 35%.

The sintered fine powder sintered body was subjected to high temperature forging at 1,250° C., and after the forged ingot was annealed for 30 minutes at 1,250° C. in the atmosphere, the ingot was subjected to cold rolling to produce a strengthened platinum material having a thickness of 1 mm.

COMPARATIVE EXAMPLE 1

In this Comparative Example 1, 4 kg of the flake-like powder after the above wet-milling and drying was first charged into a steel die and compressed by a pressure of 650 MPa to form a molded body (51 mm long×68 mm wide×60 mm high). The molded body was heated for one hour at 1,250° C. in the atmosphere, and then again charged into the steel die and compressed by a pressure of 850 MPa. The denseness of the molded body after the compression was 95%.

The molded body was, similarly to the above Example, subjected to high temperature forging at 1,250° C., and after the forged ingot was annealed for 30 minutes at 1,250° C. in the atmosphere, the ingot was subjected to cold rolling to produce a strengthened platinum material having a thickness of 1 mm.

COMPARATIVE EXAMPLE 2

In this Comparative Example 2, 4 kg of the platinum alloy fine powder after the above wet-milling and drying was first charged into a cylindrical aluminum crucible (porous aluminum crucible) of 80 mm of inside diameter×150 mm deep, heated from room temperature to 1,600° C. at a rate of temperature increase of 10° C./min in an air atmosphere in an electric furnace, and sintered for three hours while maintaining a temperature of 1,600° C. A sintered body was then cooled and taken out of the aluminum crucible, and the resultant sintered body had a denseness of 40%.

The sintered body was, similarly to the above Example, also subjected to high temperature forging at 1,250° C., and after the forged ingot was annealed for 30 minutes at 1,250° C. in an air atmosphere, the ingot was subjected to cold rolling to produce a strengthened platinum material having a thickness of 1 mm.

Results of a comparative study with regard to each of the strengthened platinum materials obtained in the above described Example, Comparative Example 1 and Comparative Example 2 are now described. The result of an evaluation of high-temperature creep properties is first described. Creep test specimens (tensile test specimen according to JIS 13B) were taken from each of the strengthened platinum materials obtained in the Example, Comparative Example 1 and Comparative Example 2, and stress rupture (creep) tests were performed under a constant load in an atmosphere at a temperature of 1,400° C. The results are shown in Table 1 to Table 3.

TABLE 1

Example 1
Durability time for creep loads (hr)

| No. | 20 MPa | 15 MPa |
|---|---|---|
| 1 | 240 | >500 |
| 2 | 152 | >500 |
| 3 | 108 | >500 |
| 4 | 124 | >500 |
| 5 | 136 | >500 |
| 6 | 307 | >500 |
| 7 | 248 | >500 |
| 8 | 322 | >500 |
| 9 | 238 | >500 |
| 10 | 188 | >500 |

TABLE 2

Comparative Example 1
Durability time for creep loads (hr)

| No. | 20 MPa | 15 MPa |
|---|---|---|
| 1 | 106 | >500 |
| 2 | 128 | >500 |
| 3 | 201 | >500 |
| 4 | 143 | >500 |
| 5 | 92 | >500 |
| 6 | 106 | >500 |
| 7 | 88 | 366 |
| 8 | 132 | >500 |
| 9 | 122 | >500 |
| 10 | 118 | >500 |

TABLE 3

Comparative Example 2
Durability time for creep loads (hr)

| No. | 15 MPa | 10 MPa |
|---|---|---|
| 1 | 23 | 328 |
| 2 | 15 | 218 |
| 3 | 18 | 264 |
| 4 | 19 | 278 |
| 5 | 16 | 240 |
| 6 | 23 | 348 |
| 7 | 25 | 401 |
| 8 | 11 | 138 |
| 9 | 12 | 142 |
| 10 | 24 | 363 |

As shown in Tables 1 to 3, creep tests for each of the strengthened platinum materials were performed under constant loads for 10 samples. As can be seen from Table 1, the strengthened platinum material in Example 1 was found to have a creep durability time of 200 hours or more in average when a load equal to 20 MPa was applied. Further, it was shown that, when a load equal to 15 MPa was applied, the material had a creep durability time of 500 hours or more.

On the other hand, as shown in Table 2, it was shown that the strengthened platinum material according to Comparative Example 1 had a creep durability time of only about 120 hours in average when a load equal to 20 MPa was applied, while some samples had a creep durability time of 500 hours or more when a load equal to 15 MPa was applied. Further, as shown in Table 3, it was shown that the strengthened platinum material according to Comparative Example 2 had a creep durability time of only about 270 hours in average when a load equal to 10 Mpa was applied, and had a low creep durability time of only about a little less than 20 hours in average when a load equal to 15 Mpa was applied.

Results of blister study are then described. Three pieces of plate each having a size of 100 mm long×100 mm wide (1 mm thick) were cut from each of the strengthened platinum materials, and after heating the plates for 24 hours at three temperatures of 1,200° C., 1,400° C., and 1,600° C. in the atmosphere, the surfaces of the plates were visually observed. The results are shown in Table 4.

TABLE 4

| | Heating temperature | | |
|---|---|---|---|
| | 1200° C. | 1400° C. | 1600° C. |
| Example | No blisters | No blisters | No blisters |
| Comparative Example 1 | No blisters | Orange peel surface | Blisters |
| Comparative Example 2 | No blisters | No blisters | No blisters |

As shown in Table 4, for the strengthened platinum material according to the Example, no blisters were found on the surface of the material at all the test temperatures. In the case of Comparative Example 1, although no blisters were found at 1,200° C., small amount of blisters like an orange peel surface were observed at 1,400° C. and the occurrence of numbers of particulate blisters were confirmed at 1,600° C. On the other hand, in the case of Comparative Example 2, no blisters were confirmed at all the temperatures.

Figure 1:
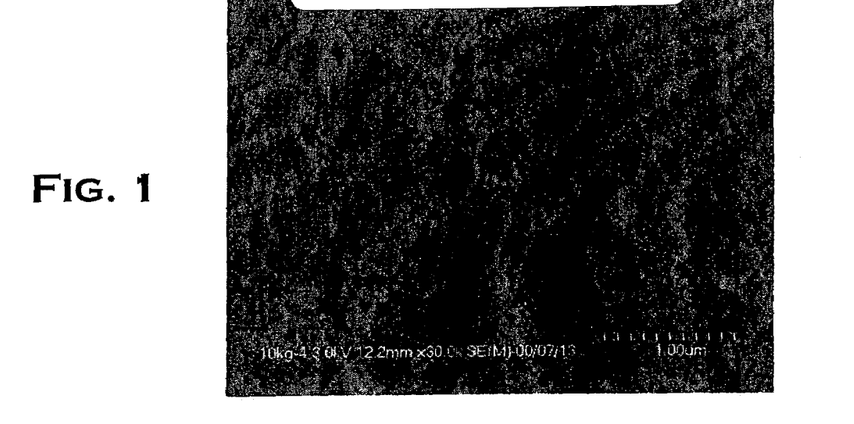
FIG. 1 is an SEM observation photograph of zirconium oxide particles in Example 1.
Figure 2:
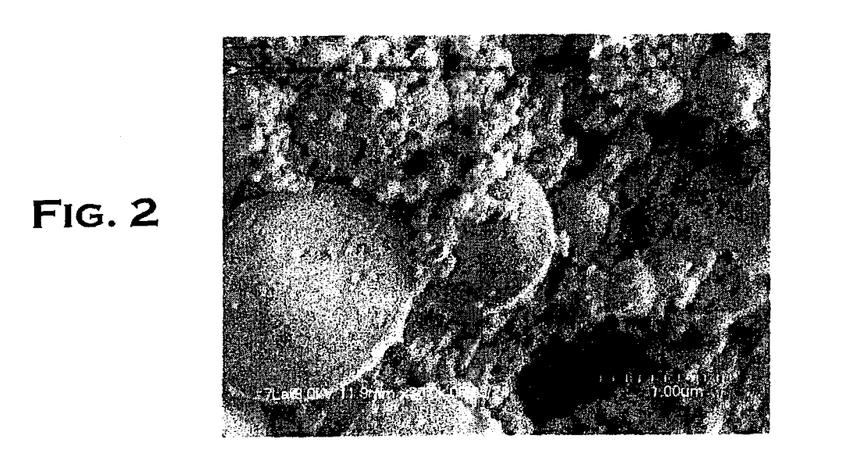
FIG. 2 is an SEM observation photograph of zirconium oxide particles in Comparative Example 2.

Results of a comparative study on the size of the metal oxide particles for each of the strengthened platinum materials are then described. The metal oxide particles in the strengthened platinum materials were observed as follows. Each of the strengthened platinum materials having a thickness of 1 mm is further rolled down to 0.3 mm thick, and a sample equal to 10 g was taken from the 0.3 mm-thick plate. After the sample was dissolved in aqua regia, the resultant solution was filtered with a filter paper (Filter Type: 0.1 μm. White VC WP, 47 mm: made by Millipore Corporation) and the residue (zirconium oxide) on the filter paper was applied to a conductive tape to be observed by FE-SEM (a magnification of 10,000× to 30,000×). SEM pictures for Example 1 and Comparative Example 2 are shown in FIGS. 1 and 2, respectively.

As a result, it was found that the zirconium oxide particles from the Example have a size of about 10 to 100 nm in diameter and those from Comparative Example 1 have similar level. On the other hand, the presence of large particles having a diameter of about 0.5 to 5 μm was confirmed for Comparative Example 2.

The following was found by summarizing the results of a comparative study of each of the above described strengthened platinum materials. For the strengthened platinum material of the Example, an excellent creep durability time was achievable, even upon applying loads of 20 MPa and 15 MPa, as high-temperature creep properties at 1,400° C., and no blisters occurred in the material itself, even upon heating in an atmosphere at a temperature of 1,200 to 1,600° C. On the other hand, in the case of Comparative Example 1, high-temperature creep properties were shown to be a similar level to the Example for a load of 15 MPa, but for 20 MPa, creep durability time was inferior to the Example, and blisters occurred in the material during the heating in an atmosphere at a temperature of 1,400° C. or higher. In the case of Comparative Example 2, no blisters occurred upon heating in an atmosphere at a temperature of 1,200° C. or higher, similarly to the Example, but only a low durability time was achievable even for a load of 15 MPa, as high-temperature creep properties at 1,400° C.

EXAMPLE 2

In this Example 2, different from the above Example 1, the case, in which degassing and sintering have been continuously performed to produce a strengthened platinum material, is described. A platinum-rhodium-10% by weight zirconium alloy ingot (Rh—Zr platinum alloy ingot) of 14 kg containing 0.2% by weight of zirconium was first prepared by vacuum melt casting. The Rh—Zr platinum alloy ingot was subjected to groove rolling to form a drawn wire having a wire diameter of 1.6 mm. The drawn wire was then melted with arc discharge using an electric arc spray gun, and the liquid was sprayed by compressed air toward a distilled water surface 1 m apart from a muzzle of the electric arc spray gun to prepare 12 kg of a spherical powder having a particle diameter of 10 to 200 µm. The spherical powder of 8 kg was charged into an open-top aluminum tray and oxidized for 24 hours at 1,100° C. in an air atmosphere to form an oxidized spherical powder. The half 4 kg of the oxidized (1,100° C.) spherical powder of 8 kg was used for Example 2 and the remaining 4 kg was used for Comparative Example 3. Another remaining 4 kg of the spherical powder was charged into an open-top aluminum tray and oxidized for 24 hours at 1,250° C. in an air atmosphere to form an oxidized spherical powder for use in Comparative Example 4.

Subsequently, each 4 kg of the oxidized spherical powder for use in the above Example 2, Comparative Example 3, and Comparative Example 4 and 7 kg of zirconia balls having a diameter of 5 mm were respectively charged into a separate Attritor pot, which is a wet-mill, and subjected to wet milling. The Attritor pot is similar to the one described in the above Example 1, and is decompressed to 0.4 Pa by a pressure-reducing mechanism. Then, 30 cc of heptane was added from a valve for charging an organic solvent while introducing argon gas into the pot, and finally the valve was closed when the pressure inside the pot reached 1.1 atm of argon pressure. The Attritor pot was attached to an upright drill press, and the milling blade was rotated at a rotational speed of 200 rpm to perform wet-milling for about 15 hours. The wet-milled fine powder was poured into a lidless stainless steel pad container and dried for two hours at 120° C. to remove heptane. Each 4 kg of the oxidized spherical powder for Example 2, Comparative Example 3, and Comparative Example 4 was respectively wet-milled and dried as described above. Each of the fine powders thus obtained had various flake-like shapes having a thickness of about 0.3 to about 1 µm, each surface area being very large.

Next, in Example 2, 4 kg of the wet-milled fine powder (oxidized at 1,100° C.) was filled into a lidless carbon container (same shape as in Example 1), put into a vacuum argon sintering furnace, heated from room temperature to 1,400° C. at a rate of temperature increase of 5° C./min. in an argon atmosphere of 0.4 kPa, and continuously degassed and sintered while being maintained for three hours at 1,400° C. When the platinum alloy fine powder was taken out from the carbon container after the degassing/sintering and cooling, the fine powder was found to have formed a sintered body having an inner shape of the carbon container, and the fine powder sintered body had a denseness of 39%.

The degassed/sintered fine powder sintered body was, as it was, subjected to high temperature forging at 1,300° C. in the atmosphere, and after the forged ingot was annealed for 30 minutes at 1,300° C. in the atmosphere, the ingot was subjected to cold rolling to produce a strengthened platinum material (Example 2) having a thickness of 1 mm.

COMPARATIVE EXAMPLE 3

In this Comparative Example 3 (a spherical powder of 4 kg oxidized at 1,100° C.), 4 kg of the flake-like powder after the above wet-milling and drying was filled into a carbon container of the same type as the above Example 2, and put into a vacuum calcinating furnace. It was heated from room temperature to 1,300° C. at a rate of temperature increase of 5° C./min in a vacuum atmosphere of 0.4 Pa, degassed while maintained for three hours at 1,300° C., and cooled. The fine powder sintered body after degassing had a denseness of 34%. The fine powder sintered body after degassing was, as it was, put into a vacuum argon sintering furnace, heated from room temperature to 1,300° C. at a rate of temperature increase of 5° C./min in an argon atmosphere of 0.4 kPa, further heated from 1,300° C. to 1,600° C. at a rate of temperature increase of. 10° C./min, and sintered for three hours while maintained at 1,600° C. The fine powder sintered body after sintering had a denseness of 40%.

The sintered fine powder sintered body was subjected to high temperature forging at 1,300° C., and the forged ingot was subjected to annealing for 30 minutes at 1,300° C. in the atmosphere. The ingot was then subjected to cold rolling to produce a strengthened platinum material (Comparative Example 3) having a thickness of 1 mm.

COMPARATIVE EXAMPLE 4

In this Comparative Example 4 (4 kg of a spherical powder oxidized at 1,250° C.), 4 kg of a flake-like fine powder after the above wet-milling and drying was filled into a carbon container of the same type as the above Example 2, and put into a vacuum calcinating furnace. It was heated from room temperature to 1,300° C. at a rate of temperature increase of 5° C./min in a vacuum atmosphere of 0.4 Pa, degassed while maintained for three hours at 1,300° C., and cooled. The fine powder sintered body after degassing had a denseness of 34%. The fine powder sintered body after degassing was, as it was, put into a vacuum argon sintering furnace, heated from room temperature to 1,300° C. at a rate of temperature increase of 5° C./min. in an argon atmosphere of 0.4 kPa, further heated from 1,300° C. to 1,600° C. at a rate of temperature increase of 10° C./min, and sintered for three hours while being maintained at 1,600° C. The fine powder sintered body after sintering had a denseness of 40%.

The fine powder sintered body after sintering was also subjected to high temperature forging at 1,300° C., and the forged ingot was subjected to annealing for 30 minutes at 1,300° C. in an air atmosphere. The ingot was then subjected to cold rolling to produce a strengthened platinum material (Comparative Example 4) having a thickness of 1 mm.

Results of a comparative study with regard to each of the strengthened platinum materials obtained in the above described Example 2, Comparative Example 3 and Comparative Example 4 are now described. Tables 5 to 7 show the results of the evaluation of high-temperature creep properties for Example 2, Comparative Example 3 and Comparative Example 4. The method for a high-temperature creep test is similar to the case of the above Example 1, and Tables 5 to 7 are the results of a creep test under predetermined loads in an atmosphere at a temperature of 1,400° C.

TABLE 5

Example 2
Durability time for creep loads (hr)

| No. | 20 MPa | 15 MPa |
|---|---|---|
| 1 | 360 | >500 |
| 2 | 520 | >500 |
| 3 | 452 | >500 |
| 4 | 488 | >500 |
| 5 | 416 | >500 |
| 6 | 375 | >500 |
| 7 | 638 | >500 |
| 8 | 515 | >500 |
| 9 | 496 | >500 |
| 10 | 371 | >500 |

TABLE 6

Comparative Example 3
Durability time for creep loads (hr)

| No. | 20 MPa | 15 MPa |
|---|---|---|
| 1 | 18 | 222 |
| 2 | 14 | 158 |
| 3 | 16 | 172 |
| 4 | 22 | 244 |
| 5 | 20 | 204 |
| 6 | 22 | 188 |
| 7 | 15 | 166 |
| 8 | 16 | 188 |
| 9 | 22 | 244 |
| 10 | 19 | 268 |

TABLE 7

Comparative Example 4
Durability time for creep loads (hr)

| No. | 15 MPa | 10 MPa |
|---|---|---|
| 1 | 11 | 111 |
| 2 | 10 | 116 |
| 3 | 9 | 98 |
| 4 | 12 | 86 |
| 5 | 8 | 108 |
| 6 | 11 | 102 |
| 7 | 10 | 124 |
| 8 | 9 | 84 |
| 9 | 10 | 79 |
| 10 | 11 | 106 |

As shown in Tables 5 to 7, creep tests for each of the strengthened platinum materials were performed under constant loads for evaluating 10 samples. As can be seen from Table 5, the strengthened platinum material in Example 2 was found to have a creep durability time of 400 hours or more in average when a load equal to 20 MPa was applied. It was shown that, when a load equal to 15 MPa was applied, the material had a creep durability time of 500 hours or more.

On the other hand, as shown in Table 6, for the strengthened platinum material according to Comparative Example 3, it was shown that the material had a creep durability time of about 200 hours in average when a load equal to 15 MPa was applied, and had a creep durability time of only about 18 hours in average when a load equal to 20 MPa was applied. Further, as shown in Table 7, for the strengthened platinum material according to Comparative Example 4, some samples had a creep durability time exceeding 100 hours when a load equal to 15 MPa was applied, but it was shown that the material had a low creep durability time of only about 10 hours in average when a load equal to 20 MPa was applied.

Results of blister study are then described. Three pieces of plate each having a size of 100 mm long×100 mm wide (1 mm thick) were cut from each of the strengthened platinum materials, and after heating the plates for 24 hours at three temperatures of 1,200° C., 1,400° C., and 1,600° C. in the atmosphere, the surfaces of the plates were visually observed. The results show that the occurrence of blisters was confirmed at none of these temperatures.

Figure 3:
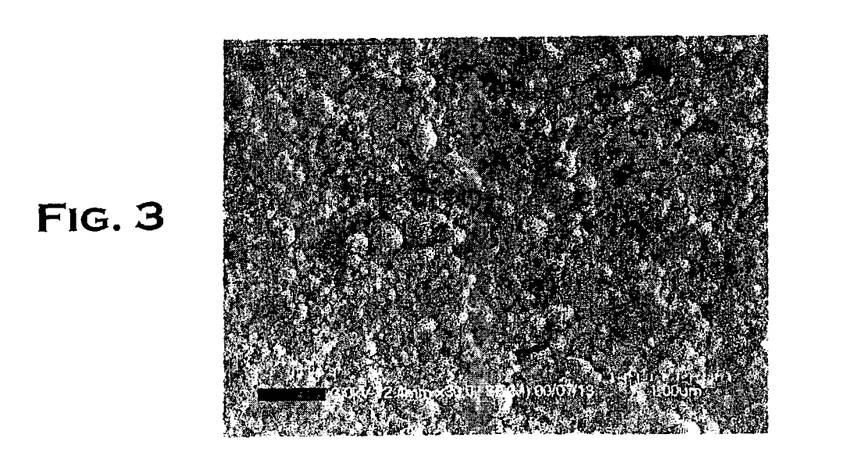
FIG. 3 is an SEM observation photograph of zirconium oxide particles in Example 2.
Figure 4:
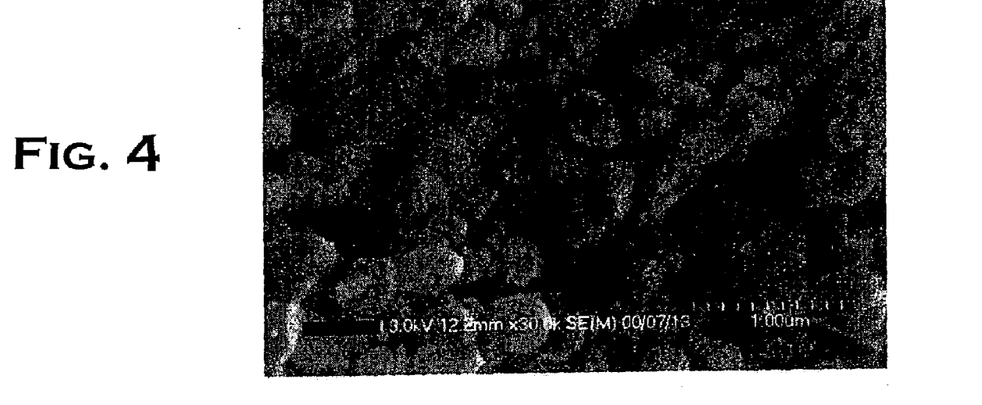
FIG. 4 is an SEM observation photograph of zirconium oxide particles in Comparative Example 3.
Figure 5:
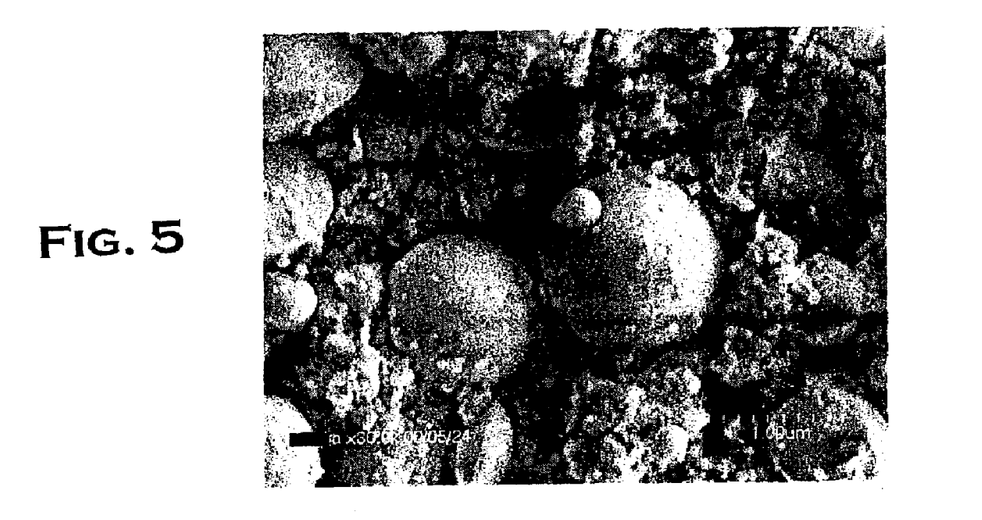
FIG. 5 is an SEM observation photograph of zirconium oxide particles in Comparative Example 4.

Finally, results of a comparative study on the size of the metal oxide particles for each of the strengthened platinum materials from Example 2, Comparative Example 3, and Comparative Example 4 are described. The metal oxide particles in the strengthened platinum materials were observed in the same manner as the above Example 1, and so the detail is omitted. FE-SEM pictures for Example 2, Comparative Example 3, and Comparative Example 4 are shown in FIGS. 3, 4 and 5, respectively.

As can be understood from these SEM pictures, it was found that the zirconium oxide particles of the Example 2 had a size of about 50 to 200 nm in diameter and those of Comparative Example 1 had similar level. On the other hand, the dispersion of particles having a diameter of about 0.1 to 1 μm, and about 0.5 to 5 μm was confirmed for Comparative Example 3, and for Comparative Example 4, respectively.

By summarizing the results of a comparative study of each of the above described strengthened platinum materials from Example 2, Comparative Examples 3 and 4, it was found that the oxide having fine particles could be obtained when the platinum alloy powder was oxidized at 1,100° C., and. continuously degassed and sintered in a vacuum argon sintering furnace. For the strengthened platinum material of the Example 2, an excellent creep durability time was achievable, even by applying stresses of 20 MPa and 15 MPa, as high-temperature creep properties at 1,400° C., and no blisters occurred in the material itself even by heating in an atmosphere at a temperature of 1,200 to 1,600° C. On the other hand, in the case of Comparative Example 3 and Comparative Example 4, properties for blisters had no problem, but with regard to high-temperature creep properties, sufficiently good durability was not shown compared with Example 2. The reason why the strengthened platinum material from Example 2 has achieved excellent high-temperature creep properties is considered that the oxide particles existing in the material is dispersed as fine particles.

INDUSTRIAL APPLICABILITY

According to the method for producing a strengthened platinum material according to the present invention, a strengthened platinum material can be obtained, in which a metal oxide such as zirconium oxide is finely dispersed, which has excellent high-temperature creep properties, and in which no blisters occur on the surface of the material even at a high-temperature heat treatment of 1,400° C.

The invention claimed is: .

1. In a method for producing a strengthened platinum material, wherein the method includes degassing a platinum alloy powder in a vacuum atmosphere at a temperature of at least 1200° C., the improvement comprising:
   preventing blisters from occurring on a surface of the strengthened platinum material and preventing unwanted increase in particle size of the platinum alloy powder by eliminating gas from a wet-milled platinum alloy fine particle size powder by degassing the powder at a temperature of 1200 to 1400° C., wherein the degassing step is conducted after the steps of forming a platinum alloy powder by melt-spray, oxidizing the platinum alloy powder and wet-milling the oxidized platinum alloy powder in an organic solvent, and wherein the degassed wet-milled platinum alloy powder is sintered in an inert gas atmosphere at a temperature of 1400 to 1700° C. and then forged 2. The method for producing a strengthened platinum material as set forth in claim 1, wherein the organic solvent is heptane or an alcohol.

3. The method for producing a strengthened platinum material as set forth in claim 1, wherein the platinum alloy comprises platinum and at least one element selected from the group consisting of: Group IVa elements, the lanthanum series rare-earth elements, rhodium, iridium, and gold.

4. The method of claim 1 further comprising the step of charging the wet-milled platinum alloy powder into a heat resistant container prior to the degassing step without substantial tapping or compression.

5. The method of claim 1, further comprising the step of preventing blisters from forming on the strengthened platinum material by performing the sintering step immediately after the degassing step, without removing the platinum alloy powder from the furnace used for the degassing step.

* * * * *